United States Patent Office

2,858,331
Patented Oct. 28, 1958

2,858,331

PRODUCTION OF CHEMICALS FROM OLEFINS WITH AID OF A PERFLUOROACID

Merrell R. Fenske and Jennings H. Jones, State College, Pa., assignors to Esso Research and Engineering Company, a corporation of Delaware No Drawing. Application October 21, 1953
Serial No. 387,522

22 Claims. (Cl. 260—497)

This invention relates to the esterification of olefins with a fluorinated carboxylic acid, and to the conversion of the resulting esters into other useful compounds. In one of its more specific aspects the invention relates particularly to the esterification of olefins with a perfluorocarboxylic acid and to the conversion of the esters into alcohols by saponification, alcoholysis, or hydrolysis.

Heretofore it has been customary to treat various olefins with sulfuric acid to produce esters, which in turn could be converted into valuable petrochemicals such as alcohols. While such processes have achieved great commercial success, they have left considerable room for improvement, particularly with respect to the treatment of the more reactive ethylene homologues. For instance, unless very carefully controlled as to reaction temperature and acid concentration, the prior art processes have tended to convert the higher olefins, especially tertiary olefins higher than $C_4$, into undesirable by-products such as polymers. Also, since the alcohol formation generally involved hydrolysis of the sulfate ester, the acid itself was recovered in greatly diluted form and required expensive concentration prior to reuse. Furthermore, the sulfate ester itself cannot always be isolated as such. Also, sulfuric acid has not been found practical for reaction with cyclic and certain other olefins because of polymerization. Sulfuric acid is also objectionable because it can oxidize and sulfonate as well as esterify. The former characteristics lead to low yields, emulsions, tars, acid degradation and $SO_2$ formation. Further, sulfuric acid is not of much use in hydrating olefins having more than six carbon atoms.

It is, therefore, an object of the present invention to provide an efficient method for converting compounds with one or more unconjugated ethylenic linkages, and particularly aliphatic as well as cyclic mono-olefins into stable esters or hydroxy-compounds, with a minimum of by-products. Another object is to convert olefins into alcohols in a process allowing recovery of the reagent acid from the intermediate ester in a form suitable for further esterification of olefins without requiring troublesome reconcentration. These and other objects will become more clearly apparent from the subsequent description.

A peculiar property has now been discoovered in perfluorocarboxylic acids, that is, carboxylic acids having all hydrogen atoms other than the carboxyl hydrogens replaced by fluorine, and particularly in perfluoroaliphatic acids with 2 to 6 carbon atoms per molecule. Specifically it has been found that such acids have the ability to react with double bonds of olefins and other unsaturated organic compounds which give reactions typical of ethylenic linkages, with surprisingly few side reactions. In particular it has been discovered that perfluoroacids such as trifluoroacetic, pentafluoropropionic, heptafluorobutyric and fully fluorinated dibasic acids of 3 to 5 carbon atoms per molecule such as tetrafluorosuccinic acid can be cleanly reacted with olefins to form esters, which in turn can be readily converted into the corresponding alcohols and the starting fluoroacid by methods which may involve saponification, alcoholysis, or, in the case of lower homologues, direct hydrolysis. The fluoroacids differ fundamentally from the analogous chloroacids such as trichloroacetic, since the latter give considerable amounts of high boiling material due to a lack of selective reaction. Furthermore, upon saponification with a base the chloracid is not regenerated as its sodium salt, but the chlorine atoms also undergo reaction and form the alkali chloride.

The invention may be applied to aliphatic olefins of 2 to 18 carbon atoms such as ethylene, propylene, and butenes to octadecenes or higher, as well as non-conjugated diolefins of at least 5 carbon atoms such as the non-conjugated pentadienes, hexadienes, octadienes, cyclodienes, and so on, and also to cyclic olefins of 5 to 16 carbon atoms such as cyclopentene, cyclohexene, methyl cyclohexene and their various other alkyl homologues. Depending on the relative proportions of the reactants, a non-conjugated diolefin may react either with two moles of the acid and form a diester, or with one mole of the acid and form an unsaturated monoester. Depending on the reactivities of the olefin treated and of the fluoroacid used, the fluoroacid treatment may be caried out between about $-15°$ C. and $300°$ C. Temperatures below about $+15°$ C. for perfluoromonobasic acids and below about $+50°$ C. for tetrafluorosuccinic acid are generally preferred for treating relatively highly reactive feeds such as tertiary olefins. If desired, for the case of the perfluoromonobasic acids the reaction may be performed even at temperatures below the normal freezing point of the various fluoroacids, that is, below about $-15°$ C., if a suitable low-freezing diluent is used such as methyl or ethyl chloride or the various Freon-type chlorofluoroalkanes or the like. With ethylene, propylene, the normal butenes and certain other relatively slow acting unsaturated compounds it may be advantageous to add a catalytic amount of sulfuric acid to the reaction mixture in order to speed up the esterification although such catalyst is not necessary. The reaction may be carried out at pressures ranging from 0 to 1000 or more p. s. i. g., e. g., at 0 to 20 p. s. i. g. Enough pressure is preferably used in each case to keep substantial proportions of the reactants in liquid phase. Furthermore, moderately superatmospheric pressures are frequently preferred for the purpose of raising the reaction temperature, and hence the reaction rate. However, low boiling unsaturates such as ethylene and propylene can react at adequate rates even in the vapor phase.

In carrying out the reaction it is desirable to use a slight molar excess of the fluoroacid with respect to the olefin to be esterified. Thus, a practical commercial operation may be run with about 1.1 to 2 moles of fluoroacid per mole of olefin, but this mole ratio may be raised to as much as 5 or even 10:1 if quantitative reaction of the olefin is desired for analytical or other special purposes. After completion of the reaction the resulting ester may be isolated from the reaction mixture by distillation, or the ester may be further converted in situ. Separation by distillation is especially convenient in the case of the diesters derived from diolefins, since the diesters have a very much higher boiling point than the starting materials.

The perfluoroester may be converted to alcohol by saponification, alcoholysis or hydrolysis, or it may be used as an alkylation agent to make alkylated phenol derivatives, or the like. Where saponification is used to convert the fluoroester into an alcohol, the latter may be recovered by distillation, and free fluoroacid may be regenerated from the remaining fluoroacid salt by acidolysis or acidification with a strong acid such as sulfuric or hydrochloric. Finally the liberated acid may be recovered by distillation, liquid extraction using ether type solvents, or other appropriate procedure readily apparent to persons skilled in the art.

Alternatively, in the case of higher boiling esters of perfluoromonobasic acids such as butyl, octyl, etc., the fluoro ester may be converted quantitatively into the corresponding alcohol by alcoholysis with methanol or other $C_1$ to $C_3$ alcohols, using dry hydrogen chloride or sodium as catalyst. The low boiling fluoroester is then distilled off with or followed by any excess of the light alcohol, concentrating the higher alcohol in the still. The low boiling fluoroester such as methyl trifluoroacetate is readily hydrolyzed to the low boiling alcohol and the perfluoroacid upon refluxing for a short time with an excess of water. Thus, by using a stripping column in treating trifluoroacetic acid, a water-trifluoroacetic acid azeotrope containing about 81 percent of acid may be removed from the hydrolyzed reaction mixture and used directly for esterification of further amounts of olefin. Generally speaking, aqueous solutions containing about 70% or even less of the perfluoroacids are useful for esterification within the scope of the present invention, though in great dilutions the reaction rate may be considerably reduced.

The invention will now be further illustrated by specific examples. It will be noted that all amounts, proportions, and percentages are expressed throughout on a weight basis unless otherwise indicated.

EXAMPLE 1

In a first run 112 parts (1 mole) of 1-octene and 126 parts (1.1 moles) of trifluoroacetic acid were mixed in a glass flask equipped with a reflux condenser and heated at atmospheric pressure as follows:

| Time, Hours | 0 | 2 | 4 | 6 | 8 | 10 | 12 |
|---|---|---|---|---|---|---|---|
| Temperature of Boiling Liquid, °C. | 74 | 89 | 102 | 109 | 115 | 120 | 144 |

Samples taken at the end of the sixth and twelfth hour were titrated with standard base and found to contain 20.1% and 14.0% of acid, respectively. This is equivalent to an octene conversion of 69% and 82%, respectively.

The product itself was washed with two 200-part portions of cold water and the water insoluble remainder, which amounted to about 200 parts, was distilled through a glass-packed column as follows:

| Fraction | Parts in Fract. | B. P. Range, °C. | R. I., $n_D^{20}$ | Sapon. Equiv. Found | Sapon. Equiv. Calc. |
|---|---|---|---|---|---|
| 1 | 27 | 124–127 | 1.4008 | Unreacted olefin) | |
| 2 | 162 | 167–168 | 1.3740 | 225.5 | 226 |
| Residue | 11 | | | | |

The material in fraction 2 and the residue consisted of sec-octyl trifluoroacetate, representing a yield of 78% of the theoretical. The residue was a clean product and contained no higher boiling material.

The above described reaction between octene-1 and trifluoroacetic acid was repeated in two additional runs, except that about 10 parts of p-toluenesulfonic acid were added to the reaction mixture in run 2, and about 1 part of 95% sulfuric acid was added in run 3. The small amount of acid catalyst speeded up the addition reaction, as shown by the fact that in uncatalyzed run 1 it took eight hours to reach a reflux temperature of 115° C., whereas in run 2 less than one hour was required to reach the same temperature, and in run 3 about three hours were required. After about six hours of boiling and subsequent separation as in run 1, the yields of sec-octyl trifluoroacetate obtained in runs 2 and 3 were 64% and 84%, respectively.

The relatively low ester yield in run 2 may be attributed to the presence of the relatively large amount of sulfonic acid which tends to decompose the ester into its components.

In a similar run 2-octene was boiled with a 10% molar excess of trifluoroacetic acid, in the absence of any added catalyst. After 10 hours the reflux temperature reached 110° C. and the product was found to contain 20.1% of acid, equivalent to 67% conversion of the octene. After boiling for an additional 11 hours the reflux temperature rose to 124° C., and the product was found to correspond to a 79% conversion of the 2-octene. Upon washing and distillation, an essentially pure ester fraction was recovered in a yield of about 81% of the theoretical. This ester appeared to be a mixture of 2- and 3-octyl trifluoroacetates, having a saponification equivalent of 223 (against 226 calculated). The principal portion of this ester was recovered mainly at 170° C.

In still another run 1-dodecene was similarly reacted with trifluoroacetic acid by refluxing for 10 hours. A conversion of about 74% of the dodecene was obtained. Upon washing and vacuum distilling, the main portion of the dodecyl trifluoroacetate was recovered in a portion boiling from 83 to 84° C. at 3 mm. Hg (about 240° C. at atmospheric). This fraction had a refractive index of 1.3978 and a saponification equivalent of 255 (against 282 calculated).

EXAMPLE 2

A mixture of 82 parts (1 mole) of cyclohexene and 273 parts (2 moles) of an 83.5% aqueous trifluoroacetic acid was refluxed for 24 hours at atmospheric pressure, during which time the reflux temperature gradually rose from 79 to 90° C. 61.4% conversion of cyclohexene was obtained. Upon diluting the aqueous solution with water, the ester separated. After washing with water, drying, and distilling, 102 parts of cyclohexyl trifluoroacetate were obtained, coresponding to a 52% theoretical yield based on cyclohexene charged. The ester had a refractive index, $n_D^{20}$, of 1.3854, boiled at 145 to 150° C., and had a saponification equivalent of 191 (as against 196 calculated). In the presence of a one-tenth normal solution of sodium hydroxide the ester slowly saponified at room temperature, yielding cyclohexanol and sodium trifluoroacetate. At higher temperatures the saponification was more rapid.

In a similar run using cyclopentene instead of cyclohexene, cyclopentyl trifluoroacetate was prepared by adding 136 parts (2 moles) of cyclopentene slowly during a period of 18 hours to 566 parts of a boiling aqueous azeotropic solution containing 80.5% (4 moles) of trifluoroacetic acid. The boiling point of the mixture varied from 85 to 95° C. during the addition of the cyclopentene. Finally a small amount of water was added to the homogeneous reaction product and the separated ester layer was freed by acid by washing with water. Distillation of the ester layer yielded cyclopentyl trifluoroacetate principally as a middle fraction boiling between 125 and 127° C., having a refractive index, $n_D^{20}$, of 1.3710, and a saponification equivalent of 180.5. Conversions of 65% or greater of the olefin to the ester can be obtained in this manner, provided that suitable precautions are taken to prevent loss of the rather low boiling olefin by evaporation.

The above runs show that aqueous solutions of the perfluoroacid may be used instead of the pure acid.

Furthermore, where the available aqueous solution of the perfluoroacid is too dilute to be used as such, instead of concentrating the acid by distillation it is possible to extract the acid with a complex-forming solvent such as ether which forms a water-insoluble complex. For instance, trifluoroacetic acid and diethyl ether form such a complex which contains 69.3% acid and 30.7% ether, and has a boiling point of 102° C. This complex can then be used instead of pure acid for refluxing with the olefin. In so doing, however, it is desirable that the reaction mixture be not anhydrous, as otherwise the reaction proceeds only very slowly. Thus, it is preferred to add to such mixtures about 10 to 25% of water based on the acid.

EXAMPLE 3

25.2 parts of tetramethyl ethylene and 41.9 parts of trifluoroacetic acid were mixed and refluxed for four hours, during which time the temperature gradually rose from 83 to 88° C. Titration of a sample of the reacted mixture indicated 84% conversion of the olefin. On standing for one week at room temperature, the acid content of the mixture rose from 19.3% to 31.7%, indicating decomposition of some of the ester formed and thus reducing conversion of the olefin to 61%. The reaction product was washed with cold water until both the organic layer and the water wash were neutral to litmus. Finally the organic layer was distilled under vacuum as indicated below:

*Vacuum distillation schedule*

| Frac. No. | Parts in Frac. | B. P. Range, °C. (uncorrected) | R. I., $n_D^{20}$ | Sap. Equiv. Found | Sap. Equiv. Calc. |
|---|---|---|---|---|---|
| 1 | 0.5 | 25–52°/70 mm | 1.3653 | | |
| 2 | 2.3 | 51–53°/70 mm | 1.3653 | | |
| 3 | 4.0 | 51–53°/68 mm | 1.3653 | 195.5 | 198 |
| 4 | 10.8 | 54–56°/68 mm | 1.3653 | | |
| 5 | 10.8 (collected in cold trap) | 3 to 4 mm | 1.3798 | | |
| Residue | 5.7 | | 1.4419 | | |
| Total | 34.1 | | | | |

All of the above distillate fractions consisted of 2,3-dimethylbutyl-2-trifluoroacetate, free of any free acid. The total amount of ester represented a yield of 48% of the theoretical amount based on olefin charged. The residue, amounting to 23% of the olefin charged, consisted essentially of $C_{12}$ and higher unsaturated polymers of tetramethylethylene. However, decomposition and formation of polymers may be avoided by storing product at temperature below about 15° C. The 29% unaccounted for may be attributed to a loss of the volatile olefin during reaction.

13.1 parts of the 2,3-dimethylbutyl-2-trifluoroacetate prepared above were refluxed for 6 hours with a solution of 9.6 parts of sodium hydroxide in 36.4 parts of water. Thereafter the organic layer present in the reaction flask was separated with the aid of diethyl ether and distilled at atmospheric pressure. Use of the ether solvent in separating the organic and aqueous layers, while not essential, helps to prevent handling losses. The distillate which boiled from 115 to 122° C. uncorrected, presumably consisted essentially of a tertiary alcohol, 2,3-dimethylbutanol-2. This alcohol was obtained in a yield equivalent to 80% of the theoretical. This product is useful as a solvent alone or in conjunction with other known solvents, or as a defoaming agent, or a reagent in preparing still other products. For instance, its ether derivatives are of interest in perfume manufacture, its esters such as phthalates may be used as plasticizers for vinyl resins and the like, and the alcohol may also be used in alkylation reactions.

EXAMPLE 4

A mixture of 56 parts (0.5 mole) of 1-octene and 117.7 parts (0.55 mole) of heptafluorobutyric acid was placed in a flask fitted with a thermometer dipping into the liquid and with a water-cooled condenser to which a drying tube was attached. The mixture was slowly heated for 11 hours at its boiling point, which gradually rose from 119 to 152° C. A sample of the resulting product containing 14.7% of unreacted acid, equivalent to 93% conversion of the octene. After washing to remove the unreacted acid, the remainder was vacuum distilled as follows:

| Frac. | Parts | B. P. Range, °C. | $n_D^{20}$ | Sapon. Equiv. Found | Sapon. Equiv. Theory |
|---|---|---|---|---|---|
| 1 | 14 | 30–76°/15 mm | | | |
| 2 | 122 | 77–78°/15 mm. (188–190° C./ atmos.). | 1.3577 | 325.5 | 326 |
| Residue | 4 | (Slightly amber) | | | |

Fraction 2, and probably also the residue consisted of the octylheptafluorobutyrate ester, whereas fraction 1 contained a mixture of unreacted octene and the ester.

The ester can be readily saponified to yield valuable sec-capryl alcohol (d,1-octanol-2). For instance, this can be done by refluxing the ester from above fraction 2 with a 4% aqueous solution of sodium hydroxide. The resulting alcohol may be separated from the alkaline solution by steam distillation and by extraction of the distillate with diethylether. Upon removing the ether the alcohol was isolated in a yield corresponding to substantially complete saponification of the ester charged. The alcohol boiled between 176 and 177° C. and had a refractive index, $n_D^{20}$, of 1.4247, corresponding essentially to d,1-octanol-2, possibly admixed with small amounts of 1- or 3-octanol.

Using substantially the same technique as described above, good yields of the respective heptafluorobutyrate esters were prepared from cyclohexene, trimethylethylene, and 1-pentene.

EXAMPLE 5

Sec-butyl heptafluorobutyrate was prepared by bubbling a 50:50 mixture of cis- and trans-2-butene at atmospheric pressure through 21.4 grams of boiling heptafluorobutyric acid contained in a still attached to a small glass-packed column. The butene was passed into the acid slowly so that substantial amounts were absorbed. The temperature of the liquid in the still remained at about 121° C. throughout the run while the reflux temperature held at about 110° C. After cooling and washing out the acid, the remainder consisted essentially of sec-butyl heptafluorobutyrate. It distilled essentially at 123° C. and had a refractive index, $n_D^{20}$, of 1.3235. If desired, reaction may be carried out in a pressure flask or an autoclave, in order to speed up the reaction rate.

EXAMPLE 6

A mixture of 8.4 parts (0.1 mole) of 1,5-hexadiene and 47.1 parts (0.22 mole) of heptafluorobutyric acid was refluxed for 4.5 hours, during which time the boiling point of the mixture gradually rose from 70° C. to 133° C., most of the rise occurring in the first two hours. The reaction product contained 46.5% of unreacted acid, indicating that 21.3 parts of the acid had combined with the diolefin. The product, after washing with water to remove the unreacted acid, was distilled as follows:

| Fraction | Parts | B. P. Range, ° C. | $n_D^{20}$ | Sapon. Equiv. Found | Sapon. Equiv. Theory | Bromine No. Found | Bromine No. Theory |
| --- | --- | --- | --- | --- | --- | --- | --- |
| 1 | 12.0 | 51 to 53°/14 mm. (about 158-160° atmos.). | 1.3489 | 267 | 296 | 43.8 | 54.0 |
| 2 | 2.0 | 53 to 107°/14 mm | | | | | |
| 3 | 11.0 | 110 to 113°/15 mm | 1.3433 | 242 | 255 | | |

Fraction 1 possessed the properties of the unsaturated monoester, hexenyl heptfluorobutyrate, whereas fraction 3 possessed the properties of the saturated diester, hexane-2.5-diol-di(heptafluorobutyrate). These esters derived from non-conjugated diolefins may be used as sources of unsaturated alcohols and glycols, respectively.

In a similar run with hexadiene-1,5, but using only a 10% molal excess of heptafluorobutyric acid, about 67% of the latter was used up and yielded predominantly the unsaturated monoester.

In contrast to the behavior of non-conjugated diolefins, conjugated diolefins such as butadiene-1,3, isoprene, 2,3-dimethyl butadiene and the like yield high-molecular weight viscous polymers in the presence of perfluoroacids. For instance, gradual addition of about 4 parts of trifluoroacetic acid to 7 parts of isoprene at about 0° C. yielded a reddish-brown product which barely poured at room temperature. In comparison with the use of sulfuric acid or aluminum chloride as a polymerization catalyst, the perfluoroacids have the advantage in that they may be used as a homogeneous solution. Instead of polymerizing conjugated diolefins with an essentially pure perfluoroacid, an acid-ether complex such as a complex of trifluoroacetic acid and diethyl ether may be used as a catalyst.

EXAMPLE 7

Ethyl alcohol and isopropyl alcohol can also be made from the appropriate olefin by reaction with pentafluoropropionic acid, followed by simple hydrolysis of the ester. Thus, for instance, isopropyl pentafluoropropionate can be prepared by compressing propylene gas to a pressure of about 30 p. s. i. g. into a pressure vessel containing perfluoropropionic acid and heating the vesel on a steam bath. When the excess pressure disappears, more propylene may be pumped into the vessel and the reaction continued. Preferably a catalytic amount, e. g. about 1 or 2 percent, of concentrated sulfuric acid is also added to the perfluoroacid to speed up the reaction. Additional catalyst may be added at intervals to facilitate substantial completion of the reaction.

The ester prepared as above may be hydrolyzed by refluxing with water. For instance, 60 parts of the ester may be mixed with 50 parts of water and refluxed. After an hour equilibrium is reached and product may then be taken off at the head of the distillation column at a reflux ratio of about 10:1. The collected product boils at about 68° C. and consists of two liquid phases. The lower phase amounting to about 80% of the total distillate consists of propyl pentafluoropropionate and is preferably returned to the still. The upper phase consists of an aqueous solution of isopropyl alcohol containing about 50% of the latter. Essentially pure alcohol can be separated by drying the aqueous layer over potassium carbonate or by other conventional means. For instance, the alcohol concentration may be raised to 88% by distilling the alcohol from the aqueous layer as a binary mixture.

Essentially quantitative yields of alcohol can be obtained by such hydrolysis, while the aqueous solution of the fluoroacid remaining in the still can be concentrated either by distilling the acid over in the form of its monohydrate, or by extraction with ether or a like solvent. The alcohol as well as the recovered acid are water-white, demonstrating the exceptionally clear nature characteristic of the fluoroacid reaction.

A similar procedure may be used for making ethanol from ethylene through the perfluoropropionate.

The simplicity of this hydrolysis step suggests that these ethyl and propyl esters would be useful in the hydrolysis of higher esters. Thus, by using perfluoropropionic acid to react with a higher olefin such as a hexene or dodecene or the like, the resulting ester may be alcoholyzed with ethyl or propyl alcohol so as to free the higher alcohol corresponding to the original olefin while forming the ester of the lower alcohol. The ethyl or propyl ester can then be readily hydrolyzed to free the acid and alcohol for reuse.

EXAMPLE 8

Sec-octyl trifluoroacetate, prepared as described in Example 1, can be converted to octanol-2 by alcoholysis with a low molecular weight alcohol such as methanol, ethanol, or one of the propanols. For this purpose 34 parts (0.15 mole) of the octyl ester, 50 parts (1.5 moles) of methanol, and 4 parts of gaseous hydrogen chloride were charged to a glass packed distillation column where the mixture was refluxed. The resulting methyl trifluoroacetate was slowly removed as distillate over a period of six hours, until no more of the methyl ester was formed. In this manner 18.5 parts of the methyl ester were obtained, corresponding to 97% of theoretical. The ester boiled at 39° C. (uncorrected) and had a refractive index $n_D^{20}$, of 1.295 to 1.296. The excess methanol was removed from the remaining mixture as the next higher boiling distillate fraction. The residue consisted of 17 parts of octanol-2, corresponding to a yield of 87% of theoretical.

In a similar run the sec-octyl trifluoroacetate was successfully converted to octanol-2 by alcoholysis with aqueous methanol in the presence of a catalytic amount of p-toluenesulfonic acid. This demonstrates that water does not interfere with the alcoholysis.

The low molecular weight fluoroesters such as the methyl trifluoroacetate prepared above are readily hydrolyzed with water, especially when refluxed with a relatively large excess of water, that is, at least 10, or preferably 50 moles of water per mole of ester. Thus 20 parts of methyl trifluoroacetate were completely hydrolyzed by refluxing with 250 parts of water for 2.5 hours. At lower temperatures the hydrolysis proceeds more slowly.

In still another run the sec-octyl trifluoroacetate was converted to octanol by alcoholysis with n-propanol. In this run 46 parts (0.23 mole) of sec-octyl trifluoroacetate were mixed with 40 parts (0.167 mole) of n-propanol, 10.8 parts (0.6 mole) of water and 0.05 part of p-toluenesulfonic acid as catalyst. The propanol present was sufficient to make all reactants miscible at room temperature. The homogeneous mixture was charged to a glass packed column and distilled. Refluxing began when the vapor temperature reached 78° C. and about one hour later product started coming off at a reflux temperature of 69° C. After eight hours 40 parts of distillate were collected, 10 parts as a supernatant water layer and 30 parts of a lower layer consisting essentially of propyl trifluoroacetate. The residue from the distillation contained an essentially quantitative yield (25 parts) of octanol-2.

Redistillation of the propyl trifluoroacetate layer gave a product boiling at 81 to 83° C., having a refractive index $n_D^{20}$=1.3243, and a sapon. equivalent=160 (as against 156 theoretical). Complete hydrolysis of the propyl ester was accomplished by refluxing it with water. Substantial hydrolysis may also be obtained by shaking the ester with water at lower temperatures, e. g. 50° C. Thus, the overall reaction involves conversion of an olefin to an alcohol with recovery of the fluoroacid.

While direct hydrolysis of the fluoroesters is easiest with the $C_1$ to $C_3$ alkyl homologues, and fairly rapid with the cyclopentyl and cyclohexyl esters, the higher homologues may be similarly converted to alcohols, though usually in considerably smaller yields. Thus, when 20 parts of sec-octyl trifluoroacetate are mixed with 20 parts of water and a mutual solvent, e. g. about 120 parts of acetone, and the mixture is refluxed, 21% of the ester is hydrolyzed to octanol and trifluoroacetic acid at the end of 12 hours. Other mutual solvents such as methyl ethyl ketone, 1,4-dioxane, low boiling ethers and tetrahydrofurans, may be used instead of acetone to facilitate direct hydrolysis of the higher, water-immiscible fluoroesters.

EXAMPLE 9

As indicated before, the perfluoroacids react directly with a variety of unsaturated compounds, the ease of reaction depending principally on the type of compounds and on the reaction temperature. Furthermore, where such direct reaction is undesirably slow or requires high temperatures, the reaction temperature may be reduced or the reaction rate can be increased by addition of a catalyst such as concentrated sulfuric acid. This is shown below with reference to ethylene whose direct reaction with perfluoroacids is very slow except at temperatures above 100° C. or preferably above 200° C., and at higher pressures, e. g. 100 to 1000 p. s. i. g.

82.5 grams of 99.8% sulfuric acid was placed in a glass pressure flask fitted with a gage and an inlet tube. After heating the acid to 70° C. the flask was pressured to 70 p. s. i. g. with ethylene. Thereafter the reaction mixture was vigorously shaken and additional ethylene added to keep the pressure at about 70 p. s. i. g. After about 1.5 hours 12.5 grams (0.45 mole) of ethylene had been absorbed in the acid and the reaction was discontinued. The resulting product was charged to a glass packed column together with 88 grams (0.75 mole) of trifluoroacetic acid and the mixture was heated to boiling. During the first two hours 33 grams of ethyl trifluoroacetate (B. P. 60° C., $n_D^{20}$ 1.3077) was removed as distillate. This represents an ester yield of 51% of the theoretical, based on ethylene absorbed. No additional ester was obtained by further heating of the reactants in the still of the column. However, the black colored residue in the still which is rich in sulfuric acid can be re-used for absorbing additional ethylene to yield the ethyl sulfate ester which, in turn, may be converted to ethyl trifluoroacetate. The latter hydrolyzes readily upon shaking with water and produces ethanol and trifluoroacetic acid.

Alternatively, ethylene is also readily absorbed by mixtures containing about 50 to 75% trifluoroacetic acid and 50 to 25% of sulfuric acid in concentrated or preferably in anhydrous form. At 20 to 200 p. s. i. g. and 20 to 70° C., ethyl trifluoroacetate can be formed from such a reaction mixture.

As still another alternative, ethylene can be absorbed in concentrated sulfuric acid and the resulting diethyl sulfate can be refluxed with trifluoroacetic acid in such a manner that ethyl trifluoroacetate is distilled over while the concentrated sulfuric acid is liberated again in the still and can be used in the next cycle. Ethanol can then be formed by hydrolyzing the fluoroester with an excess of water.

Propylene may be similarly converted into a sec-propyl perfluoroester, except that it is not necessary to carry out the reaction under pressure. Thus, sec-propyl trifluoroacetate may be formed by bubbling propylene gas at room temperature through trifluoroacetic acid containing 5% of concentrated sulfuric acid. The alkyl ester may be separated from the reaction mixture by distillation, whereupon it may be converted into isopropanol by refluxing with water. Under pressures of 100 to 500 p. s. i. g., and at temperatures between 100 and 200° C. propylene can be reacted with trifluoroacetic acid without addition of any catalyst such as sulfuric acid.

In another run t-butyl trifluoroacetate was made by slowly adding isobutylene at about 25 to 35° C. to a pressure vessel containing 228 parts of trifluoroacetic acid. The addition was continued for about one hour, until the pressure remained steady at 20 p. s. i. g. 152 parts of isobutylene had been absorbed. After venting, the flask contained 340 parts of product, representing a quantitative yield of the ester. The ester was separated by distillation at 220 mm. Hg, since it decomposes somewhat if distilled at atmospheric pressure.

The t-butyl trifluoroacetate may be converted into t-butyl alcohol in various ways. For instance, a small amount (0.2 to 0.4 gram) of gaseous hydrogen chloride may be bubbled into a cool mixture consisting of 34 grams of t-butyl trifluoroacetate and 32 grams of methanol. Upon quick distillation of mixture, the following fractions are obtained:

| Frac. | Grams | Boiling Range, °C. | Contents |
|---|---|---|---|
| 1 | 25 | 34–40 | $CF_3COOCH_3$ (quantitative yield). |
| 2 | 7 | 40–61 | $CH_3.O.C(CH_3)_3$ and 2 g. $CH_3OH$. |
| 3 | 27 | 64 | $CH_3OH$. |
| Residue | 6 | | t-butyl alcohol. |

Fraction 2 may be shaken with a dilute solution of sodium hydroxide to saponify any methyl trifluoroacetate and to remove any methanol present. In this manner methyl t-butyl ether (B. P. 55° C., $n_D^{20}$ 1.3689) may be prepared.

Alternatively, t-butyl alcohol may be made by saponification of the fluoroester. For this purpose, 34 g. of t-butyl trifluoroacetate is added to a solution consisting of 10 g. sodium hydroxide in 200 ml. water. The mixture may be made homogeneous in a few minutes by shaking, whereupon it is gently refluxed in order to complete the reaction. 16.5 g. of material boiling at 78° C. is obtained. This product consists of the t-butanol-water azeotrope containing 88.2% of the alcohol. The yield is equivalent to 98% of the theoretical. Essentially pure t-butyl alcohol may be made from the binary azeotrope by drying over anhydrous potassium carbonate or the like. As still another alternative, the t-butyl alcohol may be made by direct hydrolysis of the fluoroester by refluxing it with water.

EXAMPLE 10

Butene-1, butene-2, and pentene-2 have been separately converted into fluoroesters in high yields by charging the respective olefin into a glass pressure vessel containing 100 parts of trifluoroacetic acid admixed with about 3 parts of concentrated sulfuric acid. After start of the exothermic reaction the reaction mixture may be cooled to avoid too high temperatures. On the other hand, the use of higher temperature may permit reacting these olefins directly with the fluoroacid, without requiring any sulfuric acid catalyst.

Trimethyl ethylene may be reacted similarly, but it is preferable to carry out the reaction at a temperature below about 10 to 20° C., since tertiary olefins tend to be especially reactive and tend to polymerize at higher temperatures. Thus, by mixing 71.3 g. of trimethylethylene with 126.6 g. of trifluoroacetic acid at 0° C. and keeping the solution at a temperature of about 3° C. for two hours, 89% of the olefin may be converted to ester. To avoid handling losses, the reaction product may then be diluted with an equal volume of n-pentane and the solution washed, first with ice water, then with a dilute solution of potassium carbonate. The pentane is then stripped off at a reduced pressure of 400 mm. Hg, whereupon the pressure is preferably lowered still further to about 50 mm. Hg while distilling the remaining product. In this manner 153.5 g. of t-amyl trifluoroacetate (B. P. 31° C. at 50 mm. Hg, $n_D^{20}=1.3473$) is obtained, which is equivalent to 84% of the theoretical yield. This ester is stable at temperatures below about 15° C. but decomposes slowly at room temperature or higher.

As in the previous example relating to the butyl ester, the t-amyl ester may be saponified to give a high yield of t-amyl alcohol (B. P. 98–101° C., $n_D^{20}$ 1.4050), or it may be alcoholyzed with methanol to give principally amyl alcohol plus a substantial yield of methyl t-amyl ether.

Perfluoroacids, and notably trifluoroacetic acid, may be used similarly to prepare alcohols from tetramethylethylene, 2-ethyl-1-hexene, and 3-methyl-1-butene. In each case high yields of alcohols were obtained. In contrast, when sulfuric acid is used, a considerable loss of material is encountreed due to polymerization of the olefin, particularly in the case of the methylbutene.

EXAMPLE 11

Unlike sulfuric acid which causes considerable polymerization, the perfluoroacid acids are very effective for making esters from cyclic olefins. Thus when 37.6 g. of $CF_3COOH$ was gradually added to 24.6 g. of 1-methyl-1-cyclopentene during a period of about 20 minutes while maintaining the temperature at 3 to 6° C., the conversion of the olefin rapidly reached 74% and rose to 85% on standing at 3° C. for two more hours. The product was washed with ice water to remove unreacted acid and 52 grams of ester isolated.

50.5 g. of this ester together with 15 g. of methanol and 0.2 g. of metallic sodium were charged to a distillation column and heated to boiling. First, 31.6 g. (99% of theoretical amount) of methyl trifluoroacetate and then unreacted methanol was removed as distillate. A residue consisting essentially of 25 g. of 1-methyl-1-cyclopentanol (B. P. 71 to 72° C. at 50 mm. Hg) was obtained, corresponding to 88% of the theoretical yield based on the olefin feed. The product was clean, no polymeric material being formed.

EXAMPLE 12

50 g. of an equimolar mixture of n-octane and octene-1 was mixed with 50.6 g. of trifluoroacetic acid and the resulting mixture refluxed for 16 hours, 87% of the octene reacted to form sec-octyl trifluoroacetate. Upon distilling the reaction product and washing the various fractions free of acid, the following materials were recovered: 23.6 g. n-octane, 2.1 g. octene-1 and 45.5 g. sec-octyl trifluoroacetate.

In another run a mixture of 47.1 g. toluene and 17.8 g. cyclohexene was refluxed for nine hours with 36.5 g. of $CF_3COOH$. During the run the boiling point of the mixture slowly rose from 69 to 82° C., and about 68% of the cyclohexene was converted as determined by titration of unreacted acid. The product was water washed to remove the excess acid and the remainder upon distillation yielded 50 g. of a toluene fraction containing some cyclohexene and boiling between 105 and 111° C., 25 g. of cyclohexyl trifluoroacetate and 0.6 g. of a higher boiling residue. It is apparent that, in contrast to a similar reaction with sulfuric acid, the perfluoroacid used here did not react with the toluene.

The two foregoing runs illustrate that the reaction of perfluoroacids with unsaturates to yield esters is applicable not only to more or less pure compounds, but also to mixtures wherein paraffinic or even aromatic hydrocarbons or still other types of materials are also present.

While the resulting esters may then be converted into alcohols or other valuable chemicals, the perfluoroacid reaction may thus also be used to separate the unsaturated aliphatic compounds from other materials. Furthermore, since tertiary olefins are much more reactive with the perfluoroacids than are secondary olefins, perfluoroacids may even be used to separate different types of olefins from each other by selective reaction under suitably chosen conditions. This is more fully described and claimed in a copending application Serial No. 397,471, filed December 10, 1953, now Patent No. 2,775,633.

EXAMPLE 13

Another perfluoroacid useful in the present invention is tetrafluorosuccinic acid, $HOOC.(CF_2)_2.COOH$. This acid is a solid which has a capillary melting point of 112.5 to 115.5° C. and a boiling point of 150° C. at 15 mm. Hg. The acid dissolves readily in oxygenated compounds such as water, diethyl ether, 1,4-dioxane, ethyl acetate, methyl ethyl ketone, anisole, and 2,5-dimethyl tetrahydrofuran. The acid is also soluble, to the extent of at least 5% or more, in tertiary type olefins such as trimethyl ethylene, 2-ethyl-1-butene, 2 - ethyl - 1 - hexene, 2,4,4 - trimethyl-1-pentene, 3,4,5,5 - tetramethyl-2-hexene, diisobutylene, 2-methyl-1-pentadecene, and the like. At moderate temperatures, e. g. at 30° C. the acid is truly dissolved in these olefins, without any noticeable reaction. On the other hand, the acid is essentially insoluble in paraffins such as n-octane or cetane, in naphthenes such as cyclohexane or decalin, in aromatics such as benzene or 1-methyl naphthalene, in certain olefins such as hexene-1 or cyclohexene, and in various other compounds such as carbon tetrachloride or bromopentane.

Perfluorosuccinic acid can be reacted with olefins under suitable conditions. For instance, a succinate ester can be prepared as follows. 22.3 g. of the acid are charged to an autoclave of 250 ml. capacity, the autoclave is pressured to 750 p. s. i. g. with ethylene, and heated to about 200 to 220° C. This temperature is maintained for nine hours while stirring the reactants. After cooling, excess ethylene is vented. 29 g. of a dark oily liquid are poured off, leaving a solid residue of about 8 g. in the autoclave. When taken up with water, the solid was found to contain about 6 g. of unreacted acid and about 2 g. of an oil similar to the main liquid portion. The latter was then distilled under vacuum, yielding mainly a fraction which boiled at 83 to 94° C. at 20 mm. Hg, had a saponification equivalent of 126 and a refractive index, $n_D^{20}$, of 1.3772. This fraction consisted essentially of diethyl perfluorosuccinate. The next higher fraction appeared to consist of a mixture of the ester and unreacted acid. The ester was thus recovered in a yield of 87% of the theoretical based on the acid consumed in the reaction.

The isolated ester was hydrolyzed by mixing it with a fourfold amount of water and refluxing. When equilibrium was reached and temperature held constant at about 76° C. product was taken off of a boiling point of 78 to 80° C. In this manner ethyl alcohol of better than 95% purity was recovered in a yield of 68% of the theoretical, based on the amount of ester charged. All of the hydrolysis products, including the distillation residue, were water white and without any sign of any decomposition product. The acid present in the aqueous residue could be either concentrated by distillation or recovered by extraction with ether.

Isopropyl alcohol was prepared similarly by pumping propylene to a pressure of 100 p. s. i. g. into an autoclave containing perfluorosuccinic acid and heating the reactants at 200° C. In this case diisopropyl perfluorosuccinate was formed as an intermediate, characterized by a boiling range of 83 to 95° C. at 5 to 6 mm. Hg and a refraction index of 1.3728. The ester yield equalled 88% of theory based on the acid consumed. The ester was found to be substantially stable to hydrolysis at room temperature, but readily hydrolyzed when heated. In the hot hydrolysis, the isopropyl alcohol was distilled over in the form of a binary mixture with water at about 80° C. This binary mixture contained 88% of isopropyl alcohol and, on the basis of ester charged, the amount recovered represented a yield of 82% of the theoretical.

In a repeat run where the autoclave was pressured with propylene to only 54 p. s. i. g. at room temperature and the reactants were heated at only about 100° C., the ester yield was about 53%, as compared with the above described yield of 88% obtained under the more drastic conditions. However, a more complete reaction may be obtained even at the milder conditions by adding about 5 to 10% of concentrated sulfuric acid to the tetrafluorosuccinic acid.

The tetrafluorosuccinic acid may also be reacted with higher olefins such as hexene-1, isobutylene, trimethylethylene or 2-ethyl-hexene-1. However, the perfluorosuccinic acid is somewhat less reactive than the monobasic perfluoroacids and consequently these reactions are preferably carried out at higher temperatures, e. g. 50 to 90° C. The resulting esters may again be hydrolyzed by heating with water at suitable temperatures.

EXAMPLE 14

While the alkyl perfluoroesters described above are useful as a source of various alcohols, they can be used for still other reactions. Thus, t-alkyl fluoroesters of the type described above may be converted to peroxides such as t-butyl hydroperoxide or di-t-butyl peroxide, or they may be converted to ethers, or they may be used for alkylation of phenols and the like.

As an example, a mixture of 28.6 g. of phenol and 17.3 g. of t-butyl trifluoroacetate was refluxed for 7 hours in a flask fitted with a water-cooled condenser. The reaction product was poured into an excess of water to remove unreacted phenol, whereupon a white solid separated. The separated solid was taken up in benzene, the benzene solution washed with hot water, the benzene was evaporated, and the solid residue taken up in acetone. Upon evaporating the acetone 5.5 grams of white solid resulted which melted between 68 and 76° C. Upon recrystallizing this solid twice from a mixture of hexanes and heptanes, fluffy white needles having a corrected melting point of 99.5 to 100° C. were obtained and identified as t-butyl phenol. The yield of this product was 68% of the theoretical. It is apparent that this alkylation method possesses numerous advantages over the more conventional synthesis of t-butyl phenol from phenol, aluminum chloride and diisobutylene or isobutylene.

In a similar reaction a hindered alkylated phenol was obtained by refluxing p-cresol with an excess of t-butyl trifluoroacetate.

In still another type of reaction the alkyl perfluoroesters may be used for the alkylation of paraffins. Thus, 51 g. of t-butyl trifluoroacetate was dissolved in 150 grams of isopentane and 14.7 g. (10% excess) of anhydrous aluminum chloride was added in small portions during a period of about 30 minutes. At least the theoretical amount of aluminum chloride is required to react with the t-butyl trifluoroacetate. Hydrogen chloride was evolved during the addition period and the product consisted of a near-solid gel. After standing at room temperature for about 30 minutes, water was added to the product in order to break the gel, the hydrocarbon layer was separated, and consecutively washed with water, a 5% solution of sodium carbonate, and again with water. After drying over calcium chloride the hydrocarbon layer was distilled, giving reflux temperatures from 42 to 152° C. and leaving 20% of the charge as a residue. The product consisted mainly of a complex mixture of hydrocarbons. A fraction boiling at 60° C. has been tentatively identified as 2-methylpentane, whereas the other fractions were not identified. A small percentage of chlorocompounds was also present in the distillate. Aluminum trifluoroacetate, which is a dry water soluble solid when pure, has been isolated from the residual reaction mixture.

EXAMPLE 15

Trifluoroacetic acid also has an interesting property in that it forms a relatively low boiling binary azeotrope with 2,2,4-trimethylpentane, also known as "isooctane." This can be resorted to as a means of separating isooctane from other hydrocarbons such as methylcyclohexane, which boils close to the normal boiling point of the isooctane (99.2° C.)

For instance, a mixture consisting of 15.7 g. isooctane, 16.3 g. methylcyclohexane (B. P. 100.8° C.) and 26.9 g. trifluoroacetic acid were charged to a distilling column and fractionated as follows:

| Frac. No. | Grams in Frac. | Reflux Temp., °C. | Acid Content, Wt. Percent | Acid Free Basis | | | |
|---|---|---|---|---|---|---|---|
| | | | | HC only, grams off | R. I., $n_D^{20}$ | Comp. of HC | |
| | | | | | | Isooctane, Wt. Percent | Me. cy.-hex., Wt. Percent |
| 1 | 2.5 | 64 | | 0.3 | 1.4168 | 20.2 | 79.8 |
| 2 | 4.8 | 64 | | 0.8 | 1.4168 | 20.2 | 79.8 |
| 3 | 5.2 | 64 | 78.4 | 1.4 | | | |
| 4 | 5.2 | 64 | | 2.0 | 1.4160 | 22.1 | 77.9 |
| 5 | 4.1 | 64 | | 2.6 | 1.4152 | 25.4 | 74.6 |
| 6 | 4.3 | | | 3.2 | 1.4155 | 24.4 | 75.6 |
| 7 | 3.8 | 89 | | 3.9 | 1.4060 | 54.5 | 45.5 |
| Residue | 22.4 | | | | 1.4049 | 57.7 | 42.3 |

As the above data show, methyl cyclohexane which is the higher boiling hydrocarbon, was concentrated in the distillate. Thus, the usual distillation process was reversed.

EXAMPLE 16

The $C_2$ to $C_4$ perfluoroacids and their derivatives can be used in still other methods of making hydroxy substituted compounds. For instance, anhydrides of the perfluoroacids may be reacted with any epoxide ring, e. g. with tetrahydrofuran, tetrahydropyran or any ethylene or trimethylene oxide or with derivatives thereof, and the resulting perfluoro diester can be hydrolyzed to give a diol. This is illustrated below.

Trifluoroacetic anhydride was prepared by the conventional method of making anhydrides. Thus, 456 g. of trifluoroacetic acid were mixed with 313 g. of phosphorus pentoxide and the mixture gently heated. The reflux temperature immediately rose to 39° C., the boiling point of the anhydride, and the latter was collected as distillate. A good yield of anhydride was collected in four hours, though some additional anhydride was also recovered on more prolonged heating.

The anhydride prepared above was used to open the epoxide ring of dimethyl tetrahydrofuran and thus to make a hexyl diester. 36.3 g. of 2,5-dimethyl tetrahydrofuran was charged to a glass pressure flask fitted with a gage and inlet tube. Also charged were 9.16 g. of trifluoroacetic anhydride and 2 ml. of trifluoroacetic acid, the latter as an acid-type catalyst. The flask and contents were heated at 95° C. for about 30 hours during which time the pressure dropped from a maximum of about 70 to 17 p. s. i. g. Titration of a sample of product at this time indicated that 65% of the epoxide had been converted.

The remaining product (126.5 grams) then was distilled under reduced pressure. In this manner the following fractions were obtained:

| Frac. No. | Grams in Frac. | B. P. Range, °C. | R. I. $n_D^{20}$ | Wt. Percent Acid Content as $CF_3COOH$ | Sapon., Actual | Equiv., Theor. |
|---|---|---|---|---|---|---|
| 1 | 41.4 | (Collected in cold trap; includes distillation losses.) | | | | |
| 2 | 3.4 | 29° to 40°/8 mm | [1] 1.3671 | 15.1 | | |
| 3 | 6.0 | 40° to 50°/8 mm | [1] 1.3681 | 17.8 | | |
| 4 | 2.3 | 50° to 65°/8 mm | [1] 1.3658 | 16.8 | | |
| 5 | 65.1 | 77° to 80°/8 mm | 1.3568 | 1.0 | 156.7 | 155 |
| Residue | 8.3 | | | | | |

[1] Acid free.

The material in fraction 1 from the above distillation consisted of unreacted dimethyl tetrahydrofuran and trifluoroacetic anhydride. The material in fractions 2, 3, and 4, on removing the acid present, was slightly unsaturated and appeared to be composed of an unsaturated ester. The latter would be expected to be a by-product of the reaction. The material in fraction 5 and the residue possessed the properties of the diester hexane-2, 5-diol-di(trifluoroacetate). The yield of diester amounted to 66 percent of the theoretical on based on the dimethyl tetrahydrofuran charged.

49.4 g. of the diester from above described fraction 5 was mixed with a solution of sodium methylate in methanol, prepared by adding 0.7 g. of sodium metal to 38 g. of methanol. The mixture was heated to boiling and in the next 75 minutes 39.6 g. of methyl trifluoroacetate were collected as distillate. This corresponds to 97% of theory. Thereafter excess methanol was removed and the diol product was distilled under reduced pressure. In this manner 15 g. of 2,5-hexane-diol (B. P. 103–105° C. at 2 mm. Hg; $n_D^{20}$ 1.4464) was obtained. This corresponds to 80% of theory. The distillation residue consisted of a viscous liquid which probably contained more of the diol. This aspect of the invention is claimed in our copending application Serial No. 428,376, filed on May 7, 1954, now Patent No. 2,802,023.

Having described the general nature and numerous illustrative examples of the invention, it will be understood that the invention is not necessarily limited thereto and that patent protection therefor is solicited within the full scope and spirit of the appended claims.

We claim:

1. A process for preparing an alcohol which comprises contacting an olefinic hydrocarbon selected from the class consisting of $C_2$ to $C_{18}$ aliphatic monoolefins, $C_5$ to $C_{16}$ cycloaliphatic monoolefins, and $C_5$ to $C_{16}$ non-conjugated aliphatic and cycloaliphatic diolefins, with a $C_2$ to $C_6$ perfluorocarboxylic acid, thereby forming the corresponding perfluoroester; treating the resulting perfluoroester with a hydroxy compound selected from the group consisting of alkali metal hydroxides, $C_1$ to $C_3$ alcohols, and water, thereby converting the perfluoroester to the corresponding alcohol and perfluoro compound; recovering the product alcohol; and regenerating the perfluorocarboxylic acid from said perfluoro compound for recontacting with said olefinic hydrocarbon.

2. A process according to claim 1 wherein the perfluorocarboxylic acid is a fully fluorinated monocarboxylic acid having 2 to 4 carbon atoms per molecule.

3. A process according to claim 1 wherein the perfluorocarboxylic acid is a fully fluorinated dicarboxylic acid having 3 to 5 carbon atoms per molecule.

4. A process according to claim 1 wherein an aqueous solution of said perfluorocarboxylic acid in a concentration of at least 70% is contacted with said olefin.

5. A process according to claim 1 wherein an ether solution of said perfluorocarboxylic acid is contacted with said olefin in the presence of about 10 to 25% water based on the perfluorocarboxylic acid present.

6. A process according to claim 1 wherein a catalytic amount of concentrated sulfuric acid is added to said perfluorocarboxylic acid.

7. A process for preparing an alcohol which comprises contacting in an esterification zone one mole of a $C_2$ to $C_8$ aliphatic monoolefin with at least 1.2 moles of a fully fluorinated $C_2$ to $C_4$ aliphatic acid contained in an aqueous solution in at least 70% concentration, thereby forming the corresponding perfluoroester, distilling the resulting reaction mixture to separate the perfluoroester, reacting the separated perfluoroester with a hydroxy-compound selected from the group consisting of alkali metal hydroxide, $C_1$ to $C_3$ alcohols, and water, whereby the corresponding alcohol and perfluoro compound are formed, recovering the alcohol, regenerating the fully fluorinated $C_2$ to $C_4$ aliphatic acid from said perfluoro compound, and recycling said acid to the esterification zone for recontacting with said olefin.

8. A process according to claim 7 wherein said hydroxy-compound is an alkali metal hydroxide, said perfluoroester is thereby converted to the corresponding alcohol and perfluorosalt, the alcohol is distilled from the perfluorosalt, said perfluorosalt is acidified with a strong mineral acid thereby regenerating the fully fluorinated $C_2$ to $C_4$ aliphatic acid.

9. A process according to claim 7 wherein said monoolefin has 2 to 3 carbon atoms, and said perfluoroester is refluxed with said hydroxy-compound consisting essentially of water and thereby is hydrolyzed to the fully fluorinated $C_2$ to $C_4$ aliphatic acid.

10. A process according to claim 7 wherein said monoolefin has 4 to 8 carbon atoms, said hydroxy-compound is a $C_1$ to $C_3$ alcohol, said perfluoroester is thereby converted to the corresponding alcohol and low boiling perfluoroester, said low boiling perfluoroester is distilled from the product alcohol, refluxed with water, and thereby hydrolyzed to the fully fluorinated $C_2$ to $C_4$ aliphatic acid.

11. A process for preparing alicyclic alcohols which comprises contacting a cyclic olefin of 5 to 7 carbon atoms in an esterification zone at esterification temperature with an excess of an aqueous solution containing a fully fluorinated fatty acid of 2 to 4 carbon atoms in a concentration of at least 70% until substantial conversion of the olefin is obtained, washing the resulting reaction mixture with water to separate remaining free acid, separating an ester-containing organic phase from the washed reaction mixture, distilling the separated organic phase, recovering an ester fraction, saponifying the ester fraction by reaction with an alkali metal hydroxide to liberate the alicyclic alcohol and a salt of the fluorinated acid, distilling off the liberated alicyclic alcohol, regenerating an aqueous solution of the fluorinated acid by reacting the fluorinated acid salt with a strong mineral acid, distilling the aqueous acid solution to recover therefrom an aqueous azeotropic mixture containing the fluorinated acid in a concentration of at least 70%, and recycling the azeotropic mixture to the esterification zone.

12. A process for preparing alicyclic alcohols which comprises contacting a cyclic olefin of 5 to 7 carbon atoms in an esterification zone at esterification temperature with an excess of an aqueous solution containing a fully fluorinated fatty acid of 2 to 4 carbon atoms in a concentration of at least 70% until substantial conversion of the olefin is obtained, washing the resulting reaction mixture with water to separate remaining free acid, separating an ester-containing organic phase from the washed reaction mixture, reacting the ester with an excess of a $C_1$ to $C_3$ alcohol, distilling off the resulting low boiling ester and any excess of the $C_1$ to $C_3$ alcohol, recovering the liberated alicyclic alcohol, hydrolyzing the distilled low boiling ester to regenerate free fluorinated acid, and recovering concentrated fluorinated acid from the hydrolyzed mixture for further use in the process.

13. A process according to claim 12 which comprises the specific improvement of extracting the aqueous hydrolyzed mixture with diethyl ether to recover the regenerated fluorinated acid, and the resulting acid-containing ether extract is recycled to the esterification zone where it is used for further olefin esterification in the presence of water added in an amount of about 10 to 25% based on the fluorinated acid present.

14. A process for preparing a perfluoroester which comprises contacting an olefinic hydrocarbon selected from the group consisting of $C_2$ to $C_{18}$ aliphatic monoolefins, $C_5$ to $C_{16}$ cycloaliphatic monoolefins, and $C_5$ to $C_{16}$ non-conjugated aliphatic and cycloaliphatic diolefins, with at least a slight molar excess and up to 10 moles of a $C_2$ to $C_6$ perfluorocarboxylic acid in aqueous solution per mole of said olefinic hydrocarbon, thereby forming the corresponding, stable perfluoroester.

15. A process according to claim 14 wherein said acid is trifluoroacetic acid.

16. A process according to claim 14 wherein said acid is heptafluorobutyric acid.

17. A process according to claim 14 wherein said acid is tetrafluorosuccinic acid.

18. A process according to claim 14 wherein said olefinic hydrocarbon is octene.

19. A process according to claim 14 wherein said olefinic hydrocarbon is butene.

20. A process according to claim 14 wherein said olefinic hydrocarbon is cyclohexene.

21. A process according to claim 14 wherein said olefinic hydrocarbon is cyclopentene.

22. A process according to claim 14 wherein said olefinic hydrocarbon is hexadiene.

References Cited in the file of this patent

UNITED STATES PATENTS

| | | |
|---|---|---|
| 1,939,384 | Buc | Dec. 12, 1933 |
| 2,317,949 | Burk | Apr. 27, 1943 |
| 2,414,706 | Babcock et al. | Feb. 17, 1947 |
| 2,525,530 | Dickey et al. | Oct. 10, 1950 |
| 2,567,011 | Diesslin et al. | Sept. 4, 1951 |
| 2,592,069 | Reid | Apr. 8, 1952 |
| 2,634,290 | Sonia et al. | Apr. 7, 1953 |
| 2,732,370 | Codding | Jan. 24, 1956 |
| 2,759,912 | Coover et al. | Aug. 21, 1956 |
| 2,775,633 | Fenske et al. | Dec. 25, 1956 |

OTHER REFERENCES

McBee et al.: Ind. Eng. Chem. 39 (1947), pp. 415–7.
Hiemenz et al.: J. Am. Chem. Soc. 71 (1949), pp. 1137–8.
Vogel: Chem. Abstracts 43 (1949), 2955 (h).
Bourne et al.: Chem. Abstracts 45 (1951), 116 (b).